United States Patent
Fang et al.

(10) Patent No.: US 10,912,174 B2
(45) Date of Patent: Feb. 2, 2021

(54) METHOD OF LIGHTING DRIVER PROTECTION IN CASE OF LOSS OF NEUTRAL CONNECTION, AND LIGHTING DRIVER INCLUDING SUCH PROTECTION

(71) Applicant: SIGNIFY HOLDING B.V., Eindhoven (NL)

(72) Inventors: Yuhong Fang, Naperville, IL (US); Xi Chen, Shanghai (CN); Harshitha Gudipati, Prospect Heights, IL (US)

(73) Assignee: SIGNIFY HOLDING B.V., Eindhoven (NL)

( * ) Notice: Subject to any disclaimer, the term of this patent is extended or adjusted under 35 U.S.C. 154(b) by 66 days.

(21) Appl. No.: 16/099,233

(22) PCT Filed: May 23, 2017

(86) PCT No.: PCT/EP2017/062325
§ 371 (c)(1),
(2) Date: Nov. 6, 2018

(87) PCT Pub. No.: WO2017/207329
PCT Pub. Date: Dec. 7, 2017

(65) Prior Publication Data
US 2019/0215919 A1    Jul. 11, 2019

(30) Foreign Application Priority Data

May 30, 2016 (WO) ............... PCT/CN2016/083946
Jun. 20, 2016 (EP) .................................. 16175226

(51) Int. Cl.
*H05B 45/50* (2020.01)
*H02H 9/04* (2006.01)
*H02H 11/00* (2006.01)

(52) U.S. Cl.
CPC ............. *H05B 45/50* (2020.01); *H02H 9/041* (2013.01); *H02H 9/048* (2013.01); *H02H 11/001* (2013.01); *Y02B 20/341* (2013.01)

(58) Field of Classification Search
CPC .......... H05B 45/50; H05B 9/04; H05B 9/048; H05B 11/001; Y02B 20/341; Y02B 20/342
See application file for complete search history.

(56) References Cited

U.S. PATENT DOCUMENTS 6,016,038 A    1/2000 Mueller et al.
6,211,626 B1    4/2001 Lys et al.
(Continued)

FOREIGN PATENT DOCUMENTS

CN    103582239 A    2/2014
CN    204291506 U    4/2015
(Continued)

*Primary Examiner* — Adolf D Berhane
(74) *Attorney, Agent, or Firm* — Daniel J. Piotrowski

(57) ABSTRACT

A lighting driver (600, 800, 900) receives an AC Mains voltage (15), employs a rectifier (630, 830, 930) to produce a rectified voltage, and supplies an output current (665) to a lighting device (20) in response to the rectified voltage. A surge protection circuit (840, 940) of the lighting driver includes a voltage clamping device (MOV2) connected across the output of the rectifier, and a differentiator circuit (843/845/847/849, 943/945/947/949) configured to differentiate between a temporary voltage spike at the input to the rectifier and a loss of neutral connection to the lighting driver. When a temporary voltage spike is detected, the voltage clamping device is activated to clamp the rectified voltage until the temporary voltage spike ends. When a loss of neutral is detected, the voltage clamping device is latched into a disabled state until the AC Mains voltage input to the lighting driver is turned off.

16 Claims, 7 Drawing Sheets

(56) References Cited

U.S. PATENT DOCUMENTS

| | | | |
|---|---|---|---|
| 6,867,634 B2* | 3/2005 | Aiello | H02M 1/4225 |
| | | | 323/355 |
| 7,103,486 B2* | 9/2006 | Tian | H02H 3/14 |
| | | | 361/42 |
| 7,957,117 B2* | 6/2011 | Divan | H02H 3/207 |
| | | | 361/118 |
| 8,547,673 B2* | 10/2013 | Natili | H02H 3/20 |
| | | | 361/91.1 |
| 2005/0024798 A1* | 2/2005 | Reynoso | H02H 3/08 |
| | | | 361/42 |
| 2010/0301752 A1* | 12/2010 | Bakre | H05B 41/2981 |
| | | | 315/86 |
| 2014/0035474 A1 | 2/2014 | Kuo et al. | |
| 2018/0302971 A1* | 10/2018 | Clauberg | H02M 1/32 |
| 2020/0256521 A1* | 8/2020 | Xiong | F21K 9/278 |

FOREIGN PATENT DOCUMENTS

| | | |
|---|---|---|
| EP | 2290777 A1 | 3/2011 |
| JP | 2013030461 A | 2/2013 |
| JP | 2015167166 A | 9/2015 |
| WO | 2012033295 A2 | 3/2012 |

\* cited by examiner

METHOD OF LIGHTING DRIVER PROTECTION IN CASE OF LOSS OF NEUTRAL CONNECTION, AND LIGHTING DRIVER INCLUDING SUCH PROTECTION

TECHNICAL FIELD

The present invention is directed generally to lighting drivers for lighting units. More particularly, various inventive methods and apparatus disclosed herein relate to a method and system of protecting a lighting driver in the case that the neutral wire connection to the lighting driver is lost.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626.

One common installation for lighting units and associated lighting drivers, including LED lighting units and LED lighting drivers, employs a three-phase AC Mains power source. In these installations, the installer typically attempts to balance the loading of all the phases as much as possible to get optimal load sharing. Typically, three-phase wires and one neutral wire are run to fixtures connected to one circuit breaker, and then one of the three phases along with neutral is connected to each lighting driver, so that each lighting driver receives an AC mains voltage of one of the three phases. In particular, a common three-phase AC Mains power source has a root mean square (RMS) voltage of 277 V between each phase and the neutral line, and 480 V between any two of the phases.

In such three-phase systems, it is possible to have the neutral wire disconnected accidentally (either during installation or after installation) in such a way that a lighting driver can be exposed to much higher than normal voltages, which can result in failure of the lighting driver and/or its associated lightings device. EP 2 290 777 discloses a circuit for protecting power supply unit against temporary surge but surge a circuit is not adapted to loss of neutral situation.

SUMMARY

The situation where the neutral wire is disconnected is illustrated by FIGS. 1 and 2. FIG. 1 illustrates an arrangement wherein first and second lighting drivers 100-1 and 100-2 are supplied power by two different phases of a three-phase AC Mains power source in normal operation. Here, each of first and second lighting drivers 100-1 and 100-2 drive one or more lighting units, for example LED lighting units. In that case, first and second lighting drivers 100-1 and 100-2 may be referred to as LED lighting drivers.

In particular, the three-phase AC Mains power source provides three AC voltages $V_{PH1}$, $V_{PH2}$ and $V_{PH3}$ between each of the three-phase wires and the neutral terminal 110. In an example installation, each of the RMS voltages of $V_{PH1}$, $V_{PH2}$ and $V_{PH3}$ is nominally 277 V (some power line variation is typical). $V_{PH1}$ of Phase 1 is supplied as an AC Mains voltage V1 between a line voltage terminal (Line) and a neutral terminal N of first lighting driver 100-1, and $V_{PH2}$ of Phase 2 is supplied as an AC Mains voltage V2 between a line voltage terminal (Line) and a neutral terminal N of second lighting driver 100-2. Thus in the example installation, each of first and second lighting drivers 100-1 and 100-2 receives a nominal AC Mains voltage of 277 VRMS.

As described above, in some cases a break 112 occurs in the connection between neutral terminal 110, or neutral wire, of the three-phase AC Mains power source and the neutral terminal of each of first and second lighting drivers 100-1 and 100-2.

FIG. 2 illustrates an arrangement wherein two lighting drivers are supplied power by a three-phase AC Mains power source under a situation where the connection to neutral terminal 110 is lost. In this case, an RMS voltage of 480 V between two phases, Phase 1 and Phase 2, of the three-phase AC Mains power source appears between the two line voltage terminals of first and second lighting drivers 100-1 and 100-2.

However, the individual voltages V1' and V2' applied between the line voltage terminal and the neutral terminal N of first and second lighting drivers 100-1 and 100-2, respectively, are indeterminate and in theory one of these individual voltages could be anywhere between 0 V and 480 VRMS (V1'+V2'=480 VRMS).

Furthermore, in the particular example where first and second lighting drivers 100-1 and 100-2 are LED lighting drivers, then each lighting driver has an output stage which operates as a "constant current" source which supplies a constant (or substantially constant) current to the LED load throughout the operating input voltage range of the lighting driver. A similar situation would apply in the case of a fluorescent ballast or an electronically ballasted High Intensity Discharge (eHID) ballast in place of an LED lighting driver. An LED lighting driver typically includes a power factor conditioning circuit (PFC), and so its input sees a constant (or substantially constant) power load, as understood by those skilled in the art. Because the power supplied to the load is constant (or substantially constant), as the input voltage supplied to such a lighting driver increases within its operating voltage range, the input current decreases to maintain the constant (or substantially constant) power. That is to say, the slope of the input impedance of such an LED lighting driver is negative during normal operation, after start-up.

In the case when first and second lighting drivers 100-1 and 100-2 that drive LED loads are connected as shown in FIG. 2 with the neutral wire disconnected, this may result in an unstable operation and guarantee that the input voltages V1' and V2' will either oscillate, or move outside of the normal operation range to find a stable operating point. For example, where input voltages V1' and V2' add up to 480 VRMS, while at the same time the input currents supplied to first and second lighting drivers 100-1 and 100-2 remain equal to each other (since they are connected in series). In general, it may be expected that one of the input voltages V1' or V2' may be substantially greater than 277 VMRS and the other may be substantially less, depending on slight differences in the input impedance characteristics between first and second lighting drivers 100-1 and 100-2. Typically, first and second lighting drivers 100-1 and 100-2 will not balance very well, and one of the lighting drivers 100-1 and 100-2 will observe nearly all of the 480 VRMS across its input terminals (i.e., between the line input terminal and neutral input terminal N), while the other one of the lighting drivers 100-1 and 100-2 will see very little voltage across its input terminals.

Furthermore, this unbalance may be exacerbated in an arrangement, such as arrangement 300 illustrated in FIG. 3, where more than one lighting driver is connected to one or both of the two phases, and particularly where the number of drivers (e.g., lighting drivers 100-1, 100-3 and 100-5) which are connected to one phase is different than the number of drivers (e.g., lighting drivers 100-2 and 100-4) which are connected to the other phase.

Such unexpected high voltages may damage the lighting driver, for example a surge protection device (SPD) of the lighting driver and/or a processor or controller of the lighting driver, and/or one or more lighting units driven by the lighting driver. As a result, the lighting driver may fail.

Thus, there is a need in the art for a method of protecting a lighting driver, and particularly a lighting driver which supplies a constant current to a lighting load, in the case of loss of the neutral connection to a three-phase AC Mains power source, particularly when two or more drivers are connected to two difference phases of the three-phase AC Mains power source. There is also a need for a lighting driver which employs such a method of protection in the event of loss of the neutral connection to a three-phase AC Mains power source.

The present disclosure is directed to inventive methods and apparatus for protecting a lighting driver, and particularly a lighting driver which supplies a constant current to a lighting load, in the event of loss of the neutral connection to a three-phase AC Mains power source.

Generally, in one aspect, lighting driver comprises: a rectifier having an input configured to receive an AC Mains voltage and further having an output configured to output a rectified voltage; an output stage configured to supply an output current in response to the rectified voltage; a surge protection circuit, comprising: a voltage clamping device connected across the output of the rectifier, and a differentiator circuit configured to differentiate between a temporary voltage spike at the input to the rectifier and a loss of a neutral connection to the lighting driver, and when the temporary voltage spike is detected to activate the voltage clamping device to clamp the rectified voltage until the temporary voltage spike ends, and when the loss of the neutral connection is detected to latch the voltage clamping device into a disabled state until the AC mains is powered off.

In some embodiments, the differentiator circuit is configured to detect when a voltage at the input to the rectifier exceeds a first voltage threshold, and when the voltage at the input to the rectifier exceeds the first voltage threshold to differentiate between the temporary voltage spike at the input to the rectifier and the loss of the neutral connection to the lighting driver based on a length of time that the voltage at the input to the rectifier continues to exceed the first voltage threshold.

In some embodiments, the differentiator circuit is configured to detect when a voltage at the input to the rectifier exceeds a first voltage threshold and, in response to the voltage at the input to the rectifier exceeding the first voltage threshold, to differentiate between the temporary voltage spike at the input to the rectifier and the loss of the neutral connection to the lighting driver by determining whether the voltage at the input to the rectifier continues to exceed the first voltage threshold after a time delay has elapsed from a time when the differentiator circuit detected that the voltage at the input to the rectifier exceeded the first voltage threshold.

In some embodiments, the differentiator circuit comprises: a high voltage detector configured to detect when a voltage at the input to the rectifier exceeds a first voltage threshold, a switch control arrangement, a latch, and a timing circuit. The differentiator circuit is configured such that, in response to the high voltage detector detecting that the voltage at the input to the rectifier exceeds the first voltage threshold: (1) the switch control arrangement activates the voltage clamping device, and (2) the timing circuit determines whether the high voltage detector continues to detect that the voltage at the input to the rectifier exceeds the first voltage threshold after a predetermined time delay has elapsed, and when the high voltage detector continues to detect that the voltage at the input to the rectifier exceeds the first voltage threshold after the predetermined time delay has elapsed then the latch latches the voltage clamping device in the disabled state until the AC mains is Powered off, and when the high voltage detector detects that the voltage at the input to the rectifier does not exceed the first voltage threshold after the predetermined time delay has elapsed, then the switch control arrangement deactivates the voltage clamping device to be in a standby state to be activated again in case the high voltage detector again detects that the voltage at the input to the rectifier exceeds the first voltage threshold again.

In some versions of these embodiments the lighting driver of claim 4 further comprises a switch connected in series with the voltage clamping device across the output of the rectifier, wherein the switch control arrangement is configured to activate the voltage clamp device by closing the switch when the high voltage detector detects that the voltage at the input to the rectifier exceeds the first voltage threshold.

In some versions of these embodiments, the latch latches the voltage clamping device into the disabled state until the AC mains is powered off by latching the switch to remain open until the AC mains is powered off.

In some versions of these embodiments, the switch comprises a silicon controlled rectifier.

In some versions of these embodiments, the differentiator circuit includes a hysteresis circuit such that after the high voltage detector detects that the voltage at the input to the rectifier exceeds the first voltage threshold, and the voltage clamping device is activated, so long as the voltage at the input to the rectifier remains greater than a hysteresis voltage lower which is less than the first voltage threshold, the switch control arrangement will continue activating the voltage clamping device.

In some embodiments, the lighting driver further comprises a DALI transceiver, wherein the lighting driver is configured such that when the differentiator circuit detects a loss of neutral connection to the lighting driver, the lighting driver communicates a DALI message via the DALI transceiver to a DALI controller which is external to the lighting driver.

In some embodiments, the voltage clamping device is a metal oxide varistor.

In another aspect, a method comprises: receiving an AC Mains Voltage at an input of a rectifier of a lighting driver; outputting a rectified voltage at the output of the rectifier; supplying an output current to a lighting device in response to the rectified voltage; providing a voltage clamping device across the output of the rectifier; detecting when a voltage at the input to the rectifier is greater than a first threshold voltage; when the voltage at the input to the rectifier is greater than the first threshold voltage, differentiating between a temporary voltage spike at the input to the rectifier and a loss of neutral connection to the lighting driver; when the temporary voltage spike is detected, activating the voltage clamping device to clamp the rectified voltage until the temporary voltage spike ends; and when the loss of the neutral connection is detected, latching the voltage clamping device into a disabled state until the AC mains is powered off.

In some embodiments, the method further includes differentiating between a temporary voltage spike at the input to the rectifier and a loss of neutral connection to the lighting driver based on a length of time that the voltage at the input to the rectifier continues to exceed the first voltage threshold.

In some embodiments, the method further includes differentiating between a temporary voltage spike at the input to the rectifier and a loss of neutral connection to the lighting driver by determining whether the voltage at the input to the rectifier continues to exceed the first voltage threshold after a time delay has elapsed from a time when it was detected that the voltage at the input to the rectifier exceeded the first voltage threshold.

In some embodiments, the method further comprises: in response to the high voltage detector detecting that the voltage at the input to the rectifier exceeds the first voltage threshold: a switch control arrangement activating the voltage clamping device; a timing circuit determining whether the high voltage detector continues to detect that the voltage at the input to the rectifier exceeds the first voltage threshold after a predetermined time delay has elapsed; when the high voltage detector continues to detect that the voltage at the input to the rectifier exceeds the first voltage threshold after the predetermined time delay has elapsed, then latching the voltage clamping device in the disabled state until the AC mains is powered off; and when the high voltage detector detects that the voltage at the input to the rectifier does not exceed the first voltage threshold after the predetermined time delay has elapsed, then deactivating the voltage clamping device to be in a standby state to be activated again in case the voltage at the input to the rectifier exceeds the first voltage threshold again.

In some versions of these embodiments, a switch is connected in series with the voltage clamping device across the output of the rectifier, the method further comprising activating the voltage clamp device by closing the switch when the voltage at the input to the rectifier exceeds the first voltage threshold.

In some versions of these embodiments, latching the voltage clamping device into the disabled state until the AC mains is powered off comprises latching the switch to remain open until the AC mains is powered off.

In some versions of these embodiments, the switch comprises a silicon controlled rectifier.

In some versions of these embodiments, the method includes, after detecting that the voltage at the input to the rectifier is greater than a first threshold voltage continuing to activate the voltage clamping device so long as the voltage at the input to the rectifier remains greater than a hysteresis voltage which is less than the first voltage threshold.

In some embodiments, the method further comprises, in response to detecting a loss of neutral connection to the lighting driver, communicating a DALI message from the lighting driver to a DALI controller which is external to the lighting driver.

In some embodiments, the voltage clamping device is a metal oxide varistor.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED light sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, tribo luminescent sources, sonoluminescent sources, radio luminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED lighting unit" refers to a lighting unit that includes one or more LED light sources as discussed above, alone or in combination with other non LED light sources.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, EEPROM and FLASH memory, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

When two or more LED lighting drivers are connected to two different phases of a three-phase AC Mains power source and the neutral wire is disconnected, this will typically result in an unstable operation where the input voltage to each LED lighting driver is indeterminate. This can lead to an overvoltage condition which can damage the LED lighting driver and lead to failure.

More generally, the inventors have recognized and appreciated that it would be beneficial to provide a lighting driver which is able to sense or detect loss of a neutral connection to the lighting driver and to take protective actions to prevent permanent damage to the lighting driver. More specifically, the inventors have recognized that it would be beneficial to provide a lighting driver which is able to differentiate or distinguish between a high voltage or overvoltage condition due to a temporary voltage spike at the input to the lighting driver and a loss of a neutral connection to the lighting driver and to take appropriate protective actions for each of these situations.

In view of the foregoing, various embodiments and implementations of the present invention are directed to inventive methods and apparatuses for a lighting driver for supplying power to drive a lighting device such as a LED lighting device, and which may prevent permanent damage to the lighting driver in the event that the neutral connection to the lighting driver is lost.

Problems which may occur in some lighting drivers when a neutral connection to the lighting driver is lost will now be described in greater detail with respect to FIGS. 4 and 5.

Figure 4:
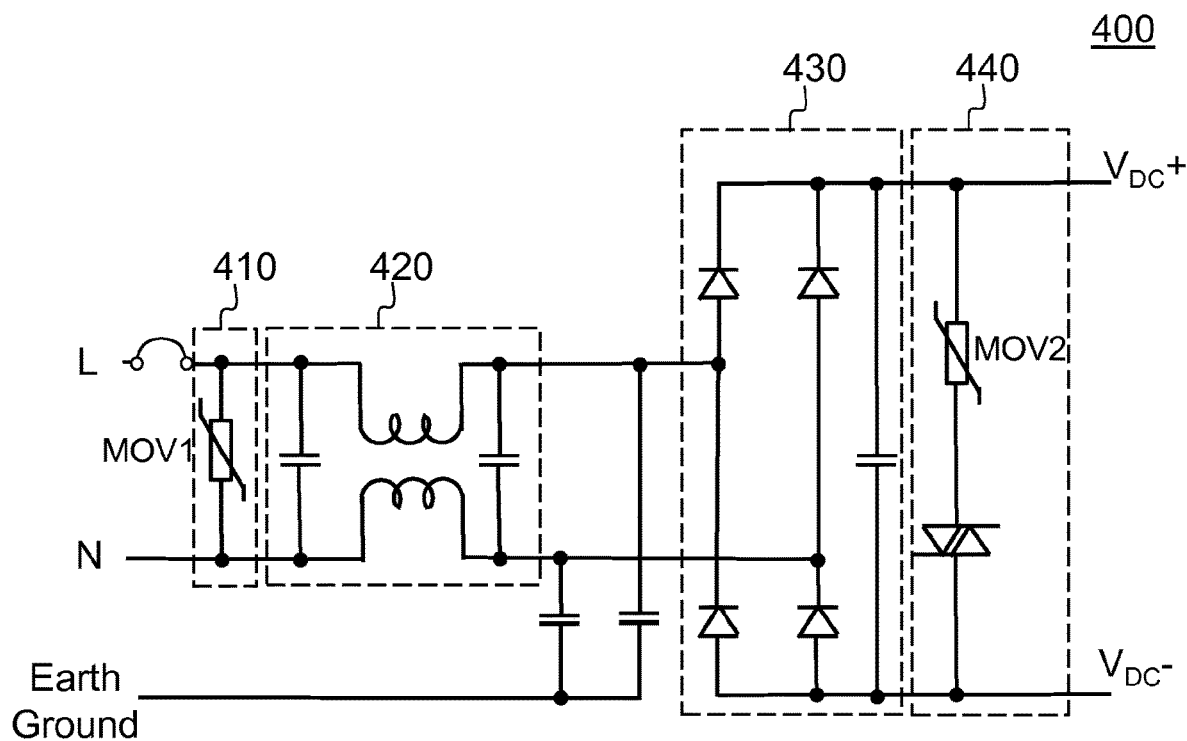
FIG. 4 shows a schematic diagram of a portion of an example embodiment of a lighting driver.

FIG. 4 shows a schematic diagram of a portion of an example embodiment of a lighting driver 400. Lighting driver 400 includes a line voltage terminal (L) and a neutral terminal (N), for receiving an AC Mains voltage, similarly to lighting drivers 100-1 and 100-2 of FIG. 1. Lighting driver 400 also includes a first surge protection circuit (SPC) 410, an electromagnetic interference (EMI) filter 420, a rectifier 430, and a second surge protection circuit (SPC) 440. Safety connections to protective earth ground are also shown. For simplification, other components of lighting driver 400, such as a controller and an output stage, are not shown in FIG. 4. In some embodiments, lighting driver 400 may supply a current to drive one or more light emitting diode (LED) light sources. In that case, lighting driver 400 may be referred to as an LED lighting driver.

First SPC 410 includes a voltage clamping device such as a metal oxide varistor (MOV) (e.g., MOV1), and provides surge protection to lighting driver 400, for example to protect lighting driver 400 from damage due to a temporary voltage spike (e.g., from lightning) at the input of lighting driver 400.

EMI filter 420 filters EMI which may be generated by lighting driver 400 from being passed onto the AC Mains lines via the L and N terminals.

In normal operation, rectifier 430 rectifies the received AC Mains voltage and supplies a rectified (DC) voltage to the other circuits of lighting driver 400 via the lines designated VDC+ and VDC− shown in FIG. 4.

Second SPC 440 may include a second voltage clamping device, MOV2, connected in series with a thyristor or SIDAC across the output of rectifier 430, and provides additional surge protection to circuits of lighting driver 400 which are supplied by rectifier 430, for example to protect components of lighting driver 400 from damage due to a temporary voltage spike (e.g., from lightning) at the input of rectifier 430.

In an example embodiment, lighting driver 400 normally receives a nominal AC Mains voltage of 277 VRMS as one phase of a three-phase AC Mains power source. In that case, in some embodiments MOV1 may be rated at a clamping voltage of 420 VRMS to provide protection for lighting driver 400 from a temporary voltage spike, for example due to lightning. Meanwhile MOV2 may be selected to have a lower clamping voltage, such as 230 VRMS, to protect devices such as MOSFETS and diodes in circuits at the output of rectifier 430 which have lower voltage ratings. Furthermore, MOV2 only conducts when the series thyristor is triggered. In that case, in some embodiments lighting driver 400 may have a 6 KV lightning surge rating.

If the nominal AC Mains voltage is 277 VRMS and the neutral terminal N becomes disconnected from the neutral terminal of the three-phase AC Mains power source, then the voltage between the L and N terminals of lighting driver 400 may rise to as much as 480 VRMS. If MOV1 is rated at 420 VRMS, then it will survive the 480 VRMS received in case of loss of the neutral connection. With an input voltage 480 VRMS, the rectified voltage output by rectifier 430 is 678 V which will trigger MOV2. When that happens, MOV2 may be damaged, as it is not designed to handle such high voltages for an extended time period as would be the case if the neutral connection is lost.

Figure 5:
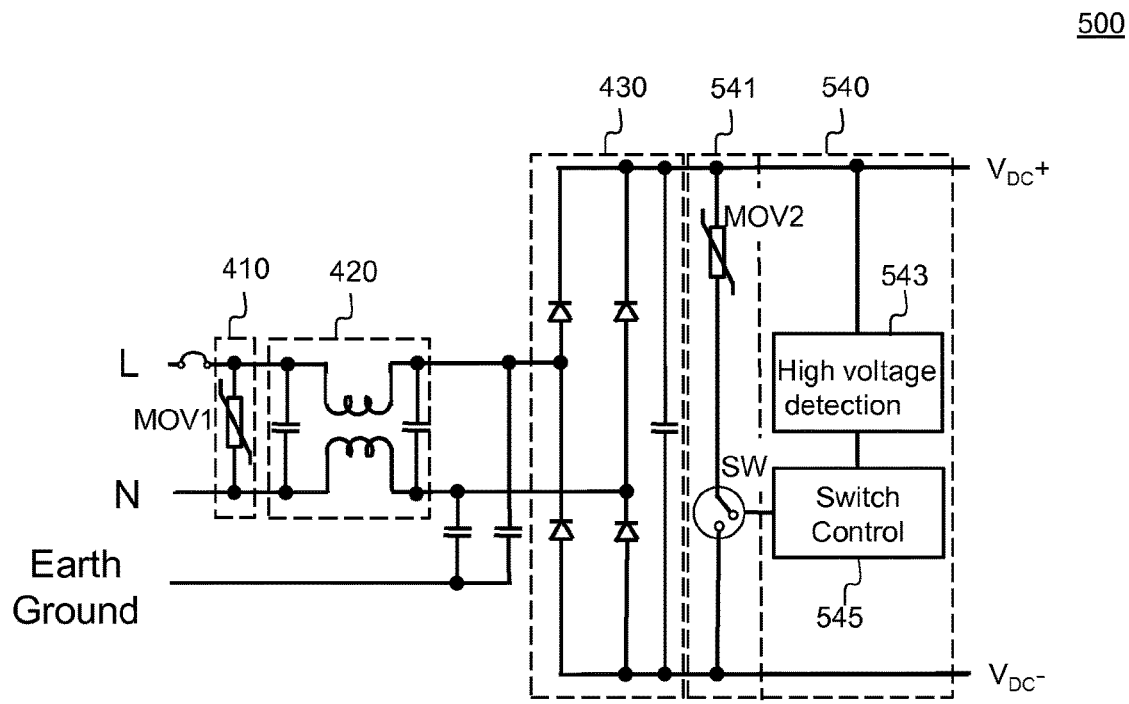
FIG. 5 shows a hybrid diagram of a portion of another example embodiment of a lighting driver.

FIG. 5 shows a hybrid diagram of a portion of another example embodiment of a lighting driver 500. Lighting driver 500 is similar to lighting driver 400 so that only the differences there between will be described.

In lighting driver 500, second SPC 540 includes a switched voltage clamping device 541, a high voltage detector 543 and a switch control arrangement 545. Switched voltage clamping device 541 includes a voltage clamping device (e.g., MOV2) connected in series with a switch SW across the output of rectifier 430. High voltage detector 543 detects the rectified voltage which is output by rectifier 430, and in response thereto provides a detection signal to switch control arrangement 545 which controls the series switch SW.

In lighting driver 500, MOV1 may be rated at a clamping voltage of 420 V and MOV2 may have a much lower clamping voltage (e.g., 230 V). Switch control arrangement 545 may turn ON the series switch SW when voltage detector 543 detects that the rectified voltage output by rectifier 430 reaches 540 V. At that point, the rectified voltage output is clamped by MOV2 to be at a voltage (e.g., 540 V) which is less than the voltage ratings of devices (e.g., MOSFETS and/or diodes) in circuits at the output of rectifier 430, in order to protect those devices.

If the neutral connection to lighting driver 500 is lost, then as explained above 480 VRMS is applied across the L and N terminals of lighting driver 500. In that case, MOV1 needs to be rated at a higher clamping voltage (e.g., 420 VRMS) to survive the 480 VRMS input voltage. However this "solution" of using a part with a higher clamping voltage is not sufficient for MOV2, as the clamping voltage for MOV2, and the threshold voltage detected by voltage detector 543 which causes switch control arrangement 545 from to turn ON the series switch SW both have to be less than the voltage ratings of devices (e.g., MOSFETS and diode) in circuits at the output of rectifier 430 in order to protect those devices. So MOV2 will be turned ON if the neutral connection to lighting driver 500 is lost, and as a result it may be damaged.

So it can be seen that it would be desirable to provide a lighting driver which can detect and respond to a loss of neutral connection. In particular, it would be desirable to provide a lighting driver which can differentiate between a temporary voltage spike at its input and a loss of a neutral connection to the lighting driver, and to take appropriate protective actions for each of these situations.

Figure 6:
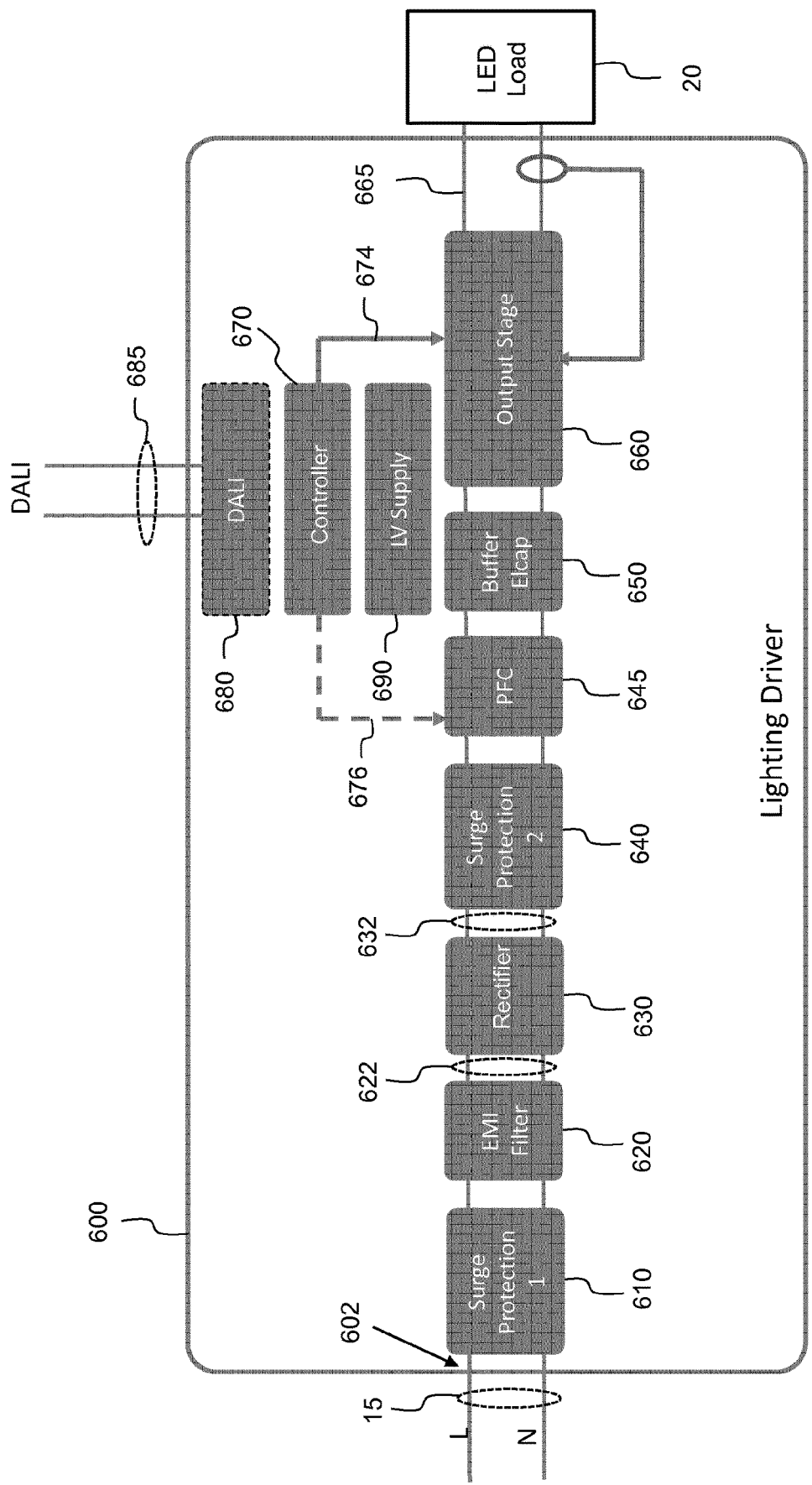
FIG. 6 illustrates an example embodiment of a lighting driver which may detect and respond to a loss of neutral connection.

FIG. 6 illustrates an example embodiment of a lighting driver which may detect and respond to a loss of neutral connection. In particular, FIG. 6 illustrates an example embodiment of an LED lighting driver 600 which is configured to drive an LED load 20, and to differentiate between a temporary voltage spike at its input and a loss of a neutral connection to lighting driver 600, and to take appropriate protective actions for each of these situations.

Figure 1:
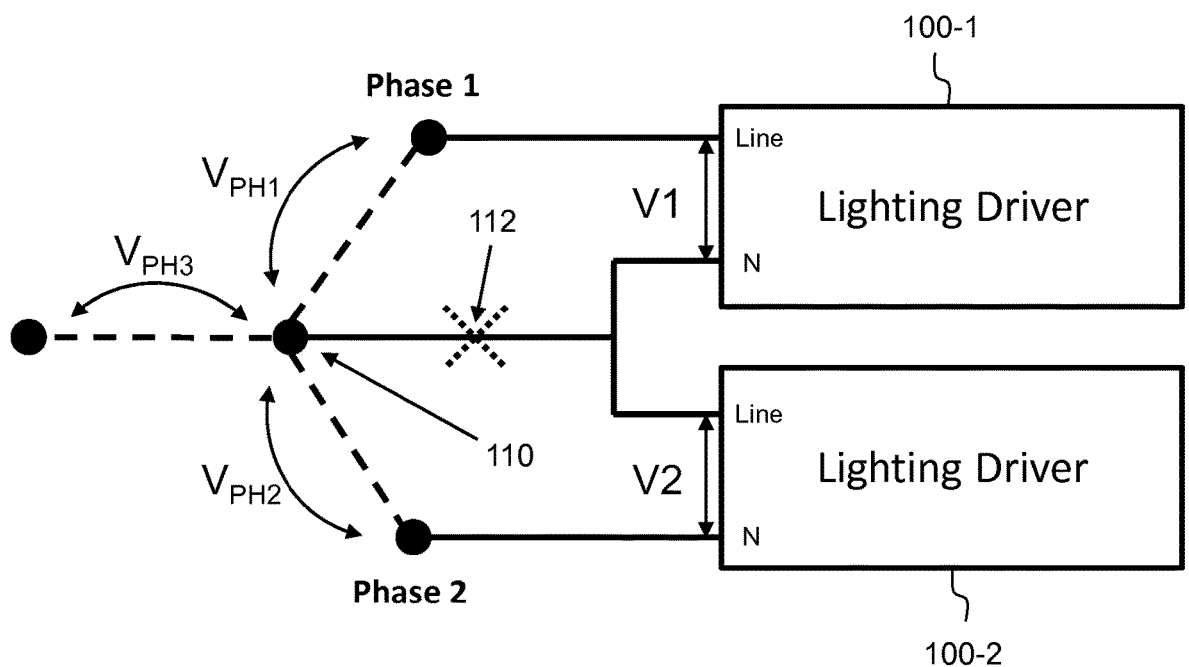
FIG. 1 illustrates an arrangement wherein two lighting drivers are supplied power by two different phases of a three-phase AC Mains power source in normal operation.
Figure 2:
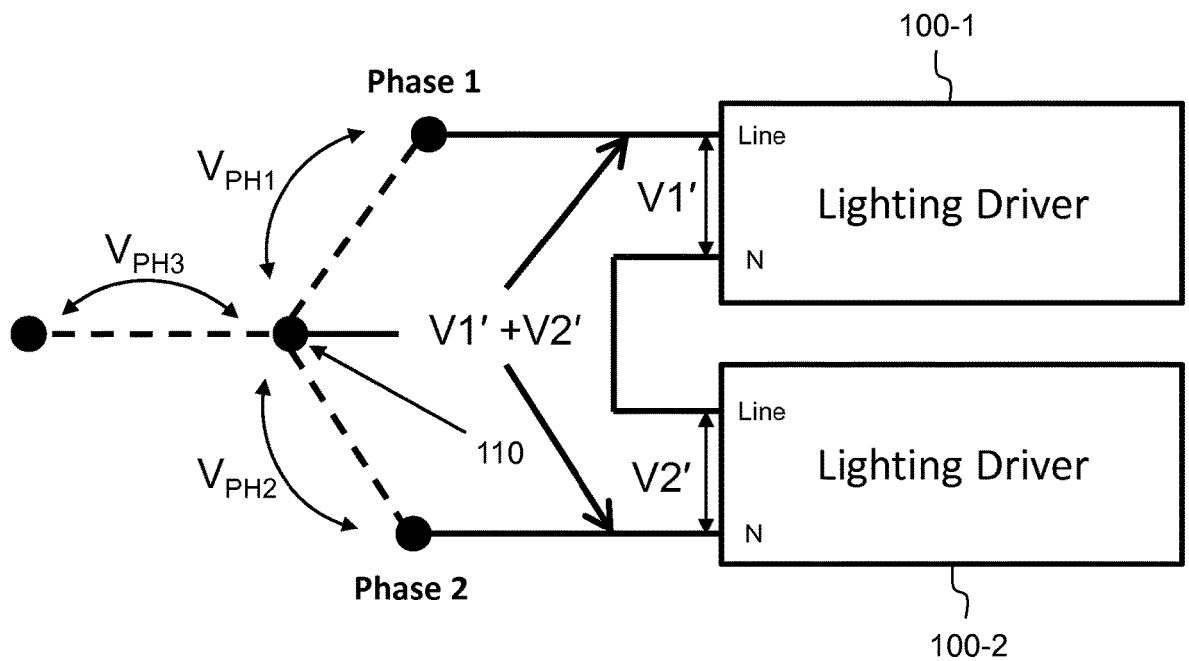
FIG. 2 illustrates an arrangement wherein two lighting drivers are supplied power by two different phases of a three-phase AC Mains power source when the connection to the neutral terminal is lost.
Figure 3:
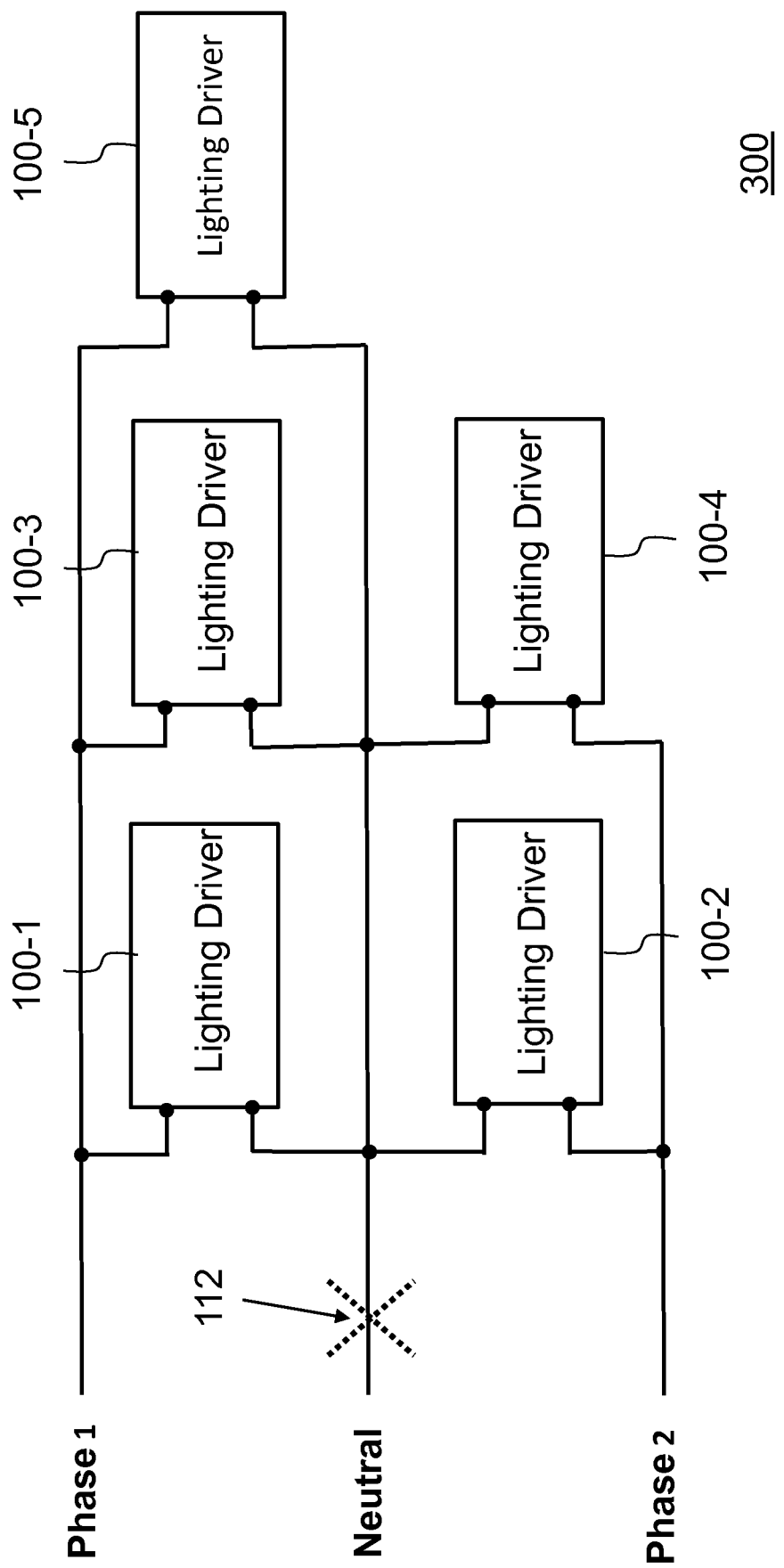
FIG. 3 illustrates an arrangement wherein multiple lighting drivers are supplied power by each of two different phases of a three-phase AC Mains power source when the connection to the neutral terminal is lost.

According to an embodiment, LED lighting driver 600 has a pair of AC Mains connection terminals 602, including a line voltage terminal and a neutral terminal, for receiving an AC Mains voltage, similarly to lighting drivers 100-1 and 100-2 of FIG. 1. LED lighting driver 600 also includes a first surge protection circuit (SPC) 610, an electromagnetic interference (EMI) filter 620, a rectifier 630, a second surge protection circuit (SPC) 640, a power factor correction circuit (PFC) stage 645, a buffer capacitor 650, an output stage 660, a controller 670 (which may include a microprocessor), an optional digital lighting interface (DALI) transceiver 680, and a low voltage (LV) supply 690.

LED driver 600 drives a lighting unit comprising an LED load 10, which may include one or more LED light sources, by supplying an output current 665 from output stage 660. DALI transceiver 680 may be connected to a DALI network (not shown) via line pair 685 such that LED lighting driver 600 may exchange DALI messages with one or more other DALI devices (e.g., a DALI controller) of the DALI network. In some embodiments, DALI transceiver 680 may be omitted. Controller 670 may be connected to receive from a sensor (e.g., a sampling resistor not shown in FIG. 6) a sensed or detected voltage 622 at the input of rectifier 630 and/or a sensed or detected voltage 632 at the output of rectifier 630, and is further connected to provide a control signal 674 to control operations of output stage 660, which in turn may sense the output current 665 supplied by output stage 660 to LED load 20. Controller 670 also optionally provides a control signal 676 for turning on and off PFC stage 640. In some embodiments, control signal 676 may be omitted.

It should be understood that LED lighting driver 600 represents only one embodiment of a LED lighting driver which is able to differentiate or distinguish between a high voltage or overvoltage condition due to a temporary voltage spike at the input to the lighting driver and a loss of a neutral connection to the lighting driver and to take appropriate protective actions for each of these situations. In other embodiments, one or more of the elements shown in FIG. 6, such as DALI transceiver 680, may be omitted, and/or additional elements not shown in FIG. 6 may be present.

In operation, LED lighting driver 600 receives an AC Mains voltage 15, typically a sinusoidal waveform, at AC Mains connection terminals 602, and in response thereto supplies power to LED load 20. More specifically, AC Mains connection terminals 602 receive AC Mains voltage 15, rectifier 630 rectifies AC Mains voltage 15 and output a rectified voltage 672; PFC stage 645, which is connected between the rectifier and the output stage, receives rectified voltage 672 and supplies power to output stage 660; and output stage supplies output current 665 to LED load 20. In normal operation, output stage 660 may function as a constant current source for supplying a constant (or substantially constant) output current 665 to LED load 20 under control of controller 670.

The construction and operation of PFC 645, buffer capacitor 650, output stage 660, and low voltage (LV) supply 690 are generally known and will not be described in detail here for brevity. The construction and operation of first surge protection circuit (SPC) 610 may be the same as first SPC 410 described above with respect to FIGS. 4 and 5, and therefore a description thereof will not be repeated.

In response to detecting that a loss of neutral connection condition has occurred, LED lighting driver 600 may take protective action. In particular, LED lighting driver 600 may disable a voltage clamping device of second SPC 640 until LED lighting driver 600 is reset (e.g., by power cycling the AC Mains input supplied to lighting driver) in order to prevent damage to the voltage clamping device. Beneficially, LED lighting driver 600 may: detect when a voltage at the input to rectifier 630 is greater than a first threshold voltage, and when the voltage at the input to rectifier 630 is greater than the first threshold voltage, differentiate between a temporary voltage spike and a loss of neutral connection to LED lighting driver 600. When the temporary voltage spike is detected, LED lighting driver 600 may activate a voltage clamping device in SPC 640 to clamp the rectified voltage until the temporary voltage spike ends. When the loss of the neutral connection is detected, LED lighting driver 600 may latch the voltage clamping device into a disabled state until the AC Mains input voltage or power to LED lighting driver 600 is powered off to reset LED lighting driver 600 (i.e., until the AC Mains voltage input to the lighting driver is turned off so that the neutral connection may be restored or reconnected to LED lighting driver 600). In various embodiments, LED lighting driver 600 may be reset in one of several ways, for example: by power cycling or toggling the AC Mains input voltage or power to LED lighting driver 600 OFF and back ON again via an external switch (e.g., a wall switch or a circuit breaker); by pushing a manual reset button or switch on LED lighting driver 600; by receiving a reset command from an external controller (e.g., via DALI transceiver 680); etc.

In some embodiments, in response to detecting that a loss of neutral connection condition has occurred, LED lighting driver 600 may cause DALI transceiver 680 to communicate an overvoltage message to the external DALI controller via the DALI network.

Further details of example embodiments of LED lighting driver 600, and example operations thereof for detecting that a loss of neutral connection condition has occurred and for distinguishing or differentiating between a temporary voltage spike and a loss of a neutral connection to LED lighting driver 600 will now be described with respect to FIGS. 7-10.

Figure 7:
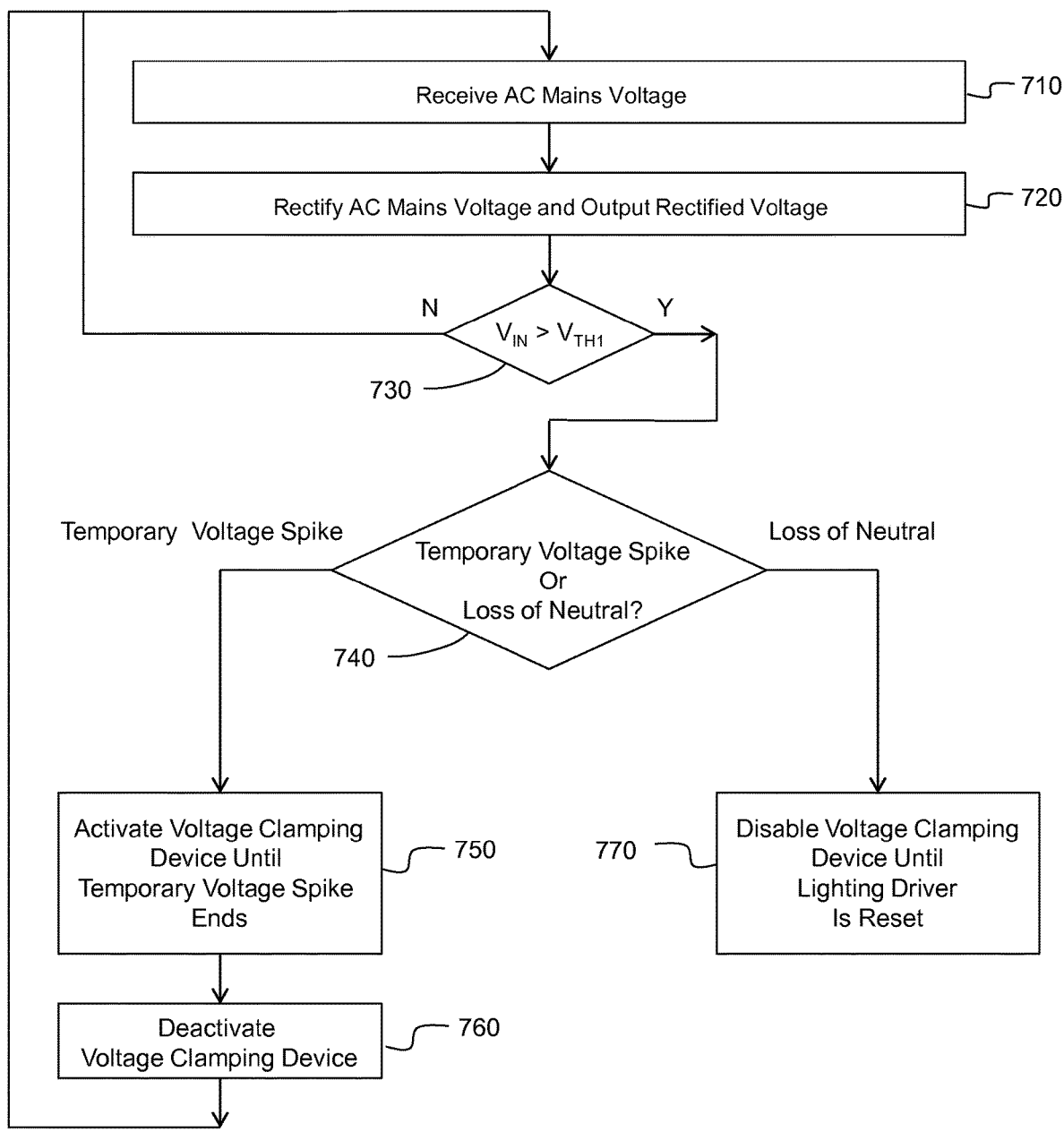
FIG. 7 shows a flowchart of a method of operating a lighting driver including detecting and responding to a loss of neutral connection.

FIG. 7 shows a flowchart of a method 700 of operating a lighting driver (e.g., LED lighting driver 600) including detecting and responding to a loss of neutral connection.

In an operation 710, a lighting driver receives at its input an AC Mains Voltage. The AC Mains voltage is supplied by to a rectifier of the lighting driver.

In an operation 720, the lighting driver rectifies the received AC Mains Voltage and outputs a rectified voltage.

Here it should be noted that it should be understood by one skilled in the art that one or more operations illustrated in FIG. 7 are continuous operations which may, and do, actually occur in parallel with each other. For example the AC Mains connection terminals may continuously receive the AC Mains voltage while the rectifier continuously rectifies the received AC Mains voltage and outputs the rectified voltage, etc.

In an operation 730, the voltage $V_{IN}$ at the input to the rectifier is detected and compared to a first threshold voltage, $V_{TH}$. Beneficially, the first threshold voltage, $V_{TH}$ is set to a level which insures that the rectified voltage is less than the voltage ratings of devices (e.g., MOSFETS and diode) in circuits at the output of the rectifier, in order to protect those devices.

If $V_{IN} \leq V_{TH1}$, then the lighting driver continues to receive the AC Mains Voltage and continues to rectify the received AC Mains Voltage and output a rectified voltage in operations 710 and 720.

However if, If $V_{IN} > V_{TH1}$, then method proceeds to an operation 740 where the lighting driver distinguishes or differentiates between a temporary voltage spike in the voltage $V_{IN}$ at the input to the rectifier, for example due to lightning, and loss of neutral connection to the lighting driver.

In general, there is a significant difference between the case of a lightning surge and the case of a loss of the neutral connection, in that there is high voltage level (plus or minus) in the voltage $V_{IN}$ at the input to the rectifier every half cycle in the case of a loss of the neutral connection, but a lightning surge is a very brief temporary event that lasts for a much shorter time than loss of the neutral connection and happens with much lower frequency than every half cycle of the input voltage. The lighting driver may take advantage of this difference in order to differentiate or distinguish between the two events and take appropriate protective action for each event. Accordingly, in some embodiments the lighting driver may differentiate between a temporary voltage spike in the voltage $V_{IN}$ at the input to the rectifier, and a loss of neutral connection to the lighting driver, based on a length of time that the voltage $V_{IN}$ at the input to the rectifier continues to exceed the first voltage threshold $V_{TH1}$.

In particular, in some embodiments that lighting driver differentiates between a temporary voltage spike in the voltage $V_{IN}$ at the input to the rectifier and a loss of neutral connection to the lighting driver by determining whether the voltage $V_{IN}$ at the input to the rectifier continues to exceed the first voltage threshold $V_{TH1}$ after a time delay $T_{TH}$ has elapsed from the time when it was detected that the voltage at the input to the rectifier exceeded the first voltage threshold.

When a temporary voltage spike (e.g., from lightning) is detected in operation 740, then the method proceeds to an operation 750, where the lighting driver activates a voltage clamping device at the output of the rectifier until the temporary voltage spike has passed. Then, in operation 760 the voltage clamping device is deactivated and the lighting driver continues to receive the AC Mains Voltage and continues to rectify the received AC Mains Voltage and output a rectified voltage in operations 710 and 720.

On the other hand, when a loss of neutral connection to the lighting driver is detected in operation 740, then the method proceeds to an operation 770, where the lighting driver latches the voltage clamping device at the output of the rectifier to be disabled until the AC mains is powered off, as discussed above. This protects the voltage clamping device from damage and the remaining circuits of the lighting driver can survive the maximum input voltage level (e.g., 480 VRMS) in case of loss of neutral.

Figure 8:
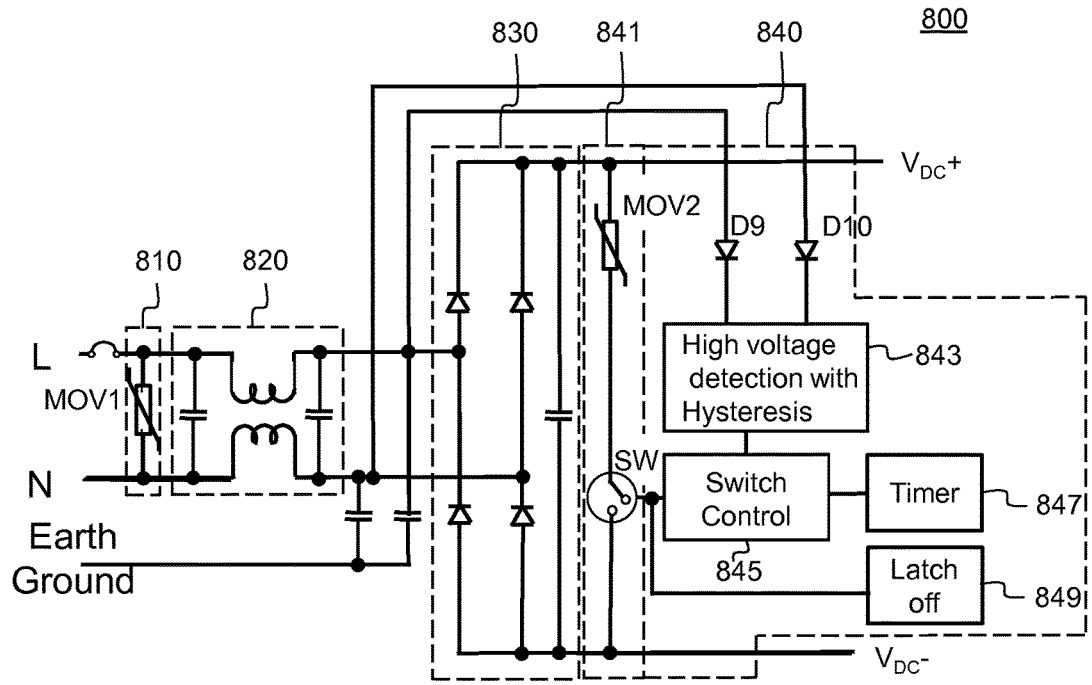
FIG. 8 shows a hybrid diagram of a portion of an example embodiment of a lighting driver which may detect and respond to a loss of neutral connection.

FIG. 8 shows a hybrid diagram of a portion of an example embodiment of a lighting driver 800 which may detect and respond to a loss of neutral connection.

Lighting driver 800 includes a line voltage terminal (L) and a neutral terminal (N), for receiving an AC Mains voltage, similarly to lighting drivers 100-1, 100-2, 400, 500 and 600 described above. Lighting driver 800 also includes a first surge protection circuit (SPC) 410, an electromagnetic interference (EMI) filter 820, a rectifier 830, and a second surge protection circuit (SPC) 840.

Lighting driver 800 may be one embodiment of LED lighting driver 600, where second SPC 840 is one embodiment of second SPC 640 of LED lighting driver 600. For simplification, other components of lighting driver 800 which are shown in FIG. 6, such as a controller, an output stage, a PFC circuit, etc., are not shown in FIG. 8. In some embodiments, lighting driver 800 may supply a current to drive one or more light emitting diode (LED) light sources. In that case, lighting driver 800 may be referred to as an LED lighting driver.

First SPC 810 includes a voltage clamping device such as a metal oxide varistor (MOV) (e.g., MOV1), and provides surge protection to LED lighting driver 800, for example to protect lighting driver 800 from damage due to a temporary voltage spike (e.g., from lightning) at the input of LED lighting driver 800. In some embodiments, MOV1 may be rated to have a clamping voltage of 420 VRMS.

EMI filter 820 filters EMI which may be generated by lighting driver 800 from being passed onto the AC Mains lines via the L and N terminals.

In normal operation, LED lighting driver 800 receives at input terminals L and N an AC Mains voltage as one phase of a three-phase AC Mains power source, and in response thereto rectifier 830 rectifies the received AC Mains voltage and supplies a rectified (DC) voltage to the other circuits (e.g., PFC circuit, output stage, etc.) of LED lighting driver 800 via the lines designated VDC+ and VDC− shown in FIG. 8.

Second SPC 840 includes a switched voltage clamping device 841, a high voltage detector 843, a switch control arrangement 845, a timing circuit 847, and a latch 849.

Switched voltage clamping device 841 includes a voltage clamping device (e.g., MOV2) connected in series with a switch SW across the output of rectifier 830.

In general, high voltage detector 843, switch control arrangement 845, timing circuit 847, and latch 849 may be considered to comprise a differentiator circuit which, as will be described in greater detail below, is configured to differentiate between a temporary voltage spike at the input to rectifier 830, and a loss of a neutral connection to LED lighting driver 800, and when the temporary voltage spike is detected to activate the voltage clamping device MOV2 by turning ON the series switch SW to clamp the rectified voltage until the temporary voltage spike ends, and when the loss of the neutral connection is detected to disable the voltage clamping device MOV2 by latching the series switch SW OFF until the AC mains input to LED lighting driver 800 is powered off.

LED lighting driver 800 addresses several issues which exist, for example, in the case lighting driver 500 in order to detect a loss of the neutral connection to the driver and to distinguish or differentiate between the loss of the neutral connection to the driver and a temporary voltage spike due to lightning.

For example, in lighting driver 500, when MOV2 is triggered, the rectified voltage between VDC+ and VDC− is clamped by MOV2, which may be at a voltage level which is less than the threshold of high voltage detector 543. To ensure that a high voltage is detected continuously even after the rectified voltage is clamped, in LED lighting driver 800 high voltage detector 843 includes a hysteresis circuit such that after high voltage detector 843 detects that the voltage at the input to rectifier 830 exceeds the first voltage threshold, so long as that voltage remains greater than a certain hysteresis voltage which is less than the first voltage threshold (e.g., a level which is less than the clamping voltage of MOV2), switch control arrangement 845 will continue to maintain the series switch SW to be ON and thereby continue to activate the voltage clamping device MOV2.

Also, in lighting driver 500, when high voltage is present between VDC+ and VDC−, the stage following second SPC 540, (i.e., the PFC stage) will be turned off. Thus, the high voltage will be maintained across the output of rectifier 530, preventing differentiation between a temporary voltage spike and a loss of a neutral connection to the lighting driver. In contrast, in lighting driver 800 high voltage detector 843 detects the AC voltage at the input of rectifier 830 through diodes D9 and D10.

Accordingly, in the case of a loss of connection from neutral to LED lighting driver 800, high voltage detector 843 will continue to detect that the input voltage $V_{IN}$ to rectifier 830 is greater than the threshold voltage $V_{TH1}$ every half cycle of the AC voltage (on positive and negative peaks). In contrast, in the case of a temporary voltage spike due to lightning, for example, one half cycle after high voltage detector 843 first detects that the input voltage $V_{IN}$ to rectifier 830 is greater than the threshold voltage $V_{TH1}$, the high voltage won't be present anymore. Accordingly, timing circuit 847 may be set to a measure a time delay T from the time when high voltage detector 843 first detects that the input voltage $V_{IN}$ to rectifier 830 is greater than the threshold voltage $V_{TH1}$. If the differentiation circuit including high voltage detector 843 no longer detects that the input voltage $V_{IN}$ to rectifier 830 is greater than the threshold voltage $V_{TH1}$ after a time delay threshold $T_{TH}$ has elapsed, then the differentiation circuit determines that a temporary voltage spike occurred and switch control arrangement 845 turns OFF series switch SW and deactivates voltage clamping device MOV2 until the next overvoltage detection (e.g., next lightning surge) occurs. On the other hand, if the differentiation circuit including high voltage detector 843 continues to detect that the input voltage $V_{IN}$ to rectifier 830 is greater than the threshold voltage $V_{TH1}$ after the time delay threshold $T_{TH}$ has elapsed, then the differentiation circuit determines that a loss of a neutral connection to LED lighting driver 800 has occurred, and latch 849 disables the voltage clamping device MOV2 by latching the series switch SW OFF until the AC Mains voltage input to lighting driver 800 is powered off, for example via a wall switch or circuit breaker so that the neutral line may be reconnected to lighting driver 800.

In some embodiments, the time delay threshold $T_{TH}$ may be greater than one half cycle of the AC mains voltage (e.g., greater than about 8.33 msec.). In some embodiments, the time delay threshold $T_{TH}$ may be less than one full cycle of the AC mains voltage (e.g., less than about 16.67 msec.).

More specifically, the differentiator circuit of LED lighting driver 800, comprising high voltage detector 843, switch control arrangement 845, timing circuit 847, and latch 849, is configured such that, in response to high voltage detector 843 detecting that the voltage $V_{IN}$ at the input to rectifier 830 exceeds the first voltage threshold $V_{TH1}$: (1) switch control arrangement 845 activates the voltage clamping device MOV by turning ON series switch SW, and (2) timing circuit 847 determines whether high voltage detector 843 continues to detect that the voltage $V_{IN}$ at the input to rectifier 830 exceeds the first voltage threshold $V_{TH1}$ after a predetermined time delay $T_{TH}$ has elapsed. When high voltage detector 843 continues to detect that the voltage $V_{IN}$ at the input to rectifier 830 exceeds the first voltage threshold $V_{TH1}$ after the predetermined time delay $T_{TH}$ has elapsed, then latch 849 disables the voltage clamping device MOV2 by latching the series switch SW OFF until AC mains is powered off. On the other hand, when high voltage detector 843 detects that the voltage $V_{IN}$ at the input to rectifier 830 does not exceed the first voltage threshold $V_{TH1}$ after the predetermined time delay $T_{TH}$ has elapsed, then switch control arrangement 845 deactivates the voltage clamping device to be in a standby state to be activated again in case high voltage detector 843 again detects that the voltage $V_{IN}$ at the input to rectifier 830 exceeds the first voltage threshold $V_{TH1}$ again.

Figure 9:
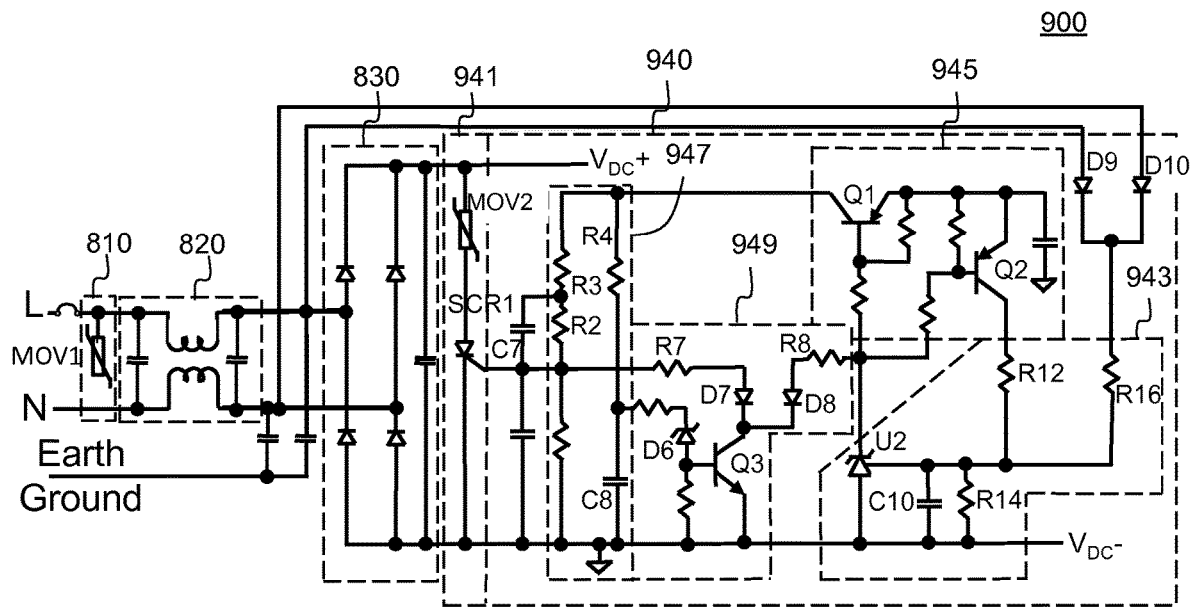
FIG. 9 shows a schematic diagram of a portion of an example embodiment of a lighting driver which may detect and respond to a loss of neutral connection.

FIG. 9 shows a schematic diagram of a portion of an example embodiment of a lighting driver 900 which may detect and respond to a loss of neutral connection. Lighting driver 900 may be one embodiment of LED lighting driver 600, where second SPC 940 is one embodiment of second SPC 640 of LED lighting driver 600. Also, lighting driver 900 may be one embodiment of LED lighting driver 800, where second SPC 940 is one embodiment of second SPC 840 of LED lighting driver 800. For simplification, other components of lighting driver 900 which are shown in FIG. 6, such as a controller, an output stage, a PFC circuit, etc., are not shown in FIG. 9. In some embodiments, lighting driver 900 may supply a current to drive one or more light emitting diode (LED) light sources. In that case, lighting driver 900 may be referred to as an LED lighting driver.

In lighting driver 900, second SPC 940 includes a switched voltage clamping device 941, a high voltage detector 943, a switch control arrangement 945, a timing circuit 947, and a latch 949. Although specific resistors, capacitors, diode, transistors, etc. are shown belonging exclusively to switched voltage clamping device 941, high voltage detector 943, switch control arrangement 945, timing circuit 947, or latch 949, in general one or more of these components may be shared between switched voltage clamping device 941, high voltage detector 943, switch control arrangement 945, timing circuit 947, and latch 949, which may be better understood as functional blocks. In general, high voltage detector 943, switch control arrangement 945, timing circuit 947, and latch 949 may be considered to comprise a differentiator circuit as discussed above.

Switched voltage clamping device 941 includes a voltage clamping device (e.g., MOV2) connected in series with a silicon controlled rectifier (SCR) across the output of rectifier 930. In LED lighting driver 900, the SCR corresponds to the series switch SW of lighting driver 800.

High voltage detector 943 includes U2, R14, R16, C10 and R12 (which provides hysteresis). In some embodiments, U2, R14, R16, C10 and R12 may be chosen to set the first threshold voltage $V_{TH1}$ to be at or about 540 V.

During normal operation of LED lighting driver 900, the maximum rectified voltage is 431V (305V*1.414), which is less than the first threshold voltage $V_{TH1}$ (e.g., 540 V) so U2, Q1, Q2 and the SCR are OFF, and MOV2 does not conduct.

Next operations of LED lighting driver 900 will be explained for a case where a loss of the neutral connection to LED lighting driver 900 occurs.

When a loss of the neutral connection to LED lighting driver 900 occurs, then the AC input voltage between input terminals L and N may become as much as 480 VRMS, in which case the peak voltage is 678.7V, which is greater than threshold voltage $V_{TH1}$ (e.g., at or about 540 V) thereby turning ON U2. This turns ON Q1, which generates a current pulse through R3 and C7 to trigger the SCR and turn ON the SCR. As a result, MOV2 is activated to become conductive and clamp the voltage at the output of rectifier 830 at a clamping voltage of MOV2, for example at about 540V.

At same time, Q2 is turned ON through resistor R12, and a small current is added to the reference node of U2, producing a hysteresis for voltage detection (i.e., a lower, second, threshold voltage $V_{TH2}$). In some embodiments, the low end of hysteresis of the input voltage to high voltage detector 943 is set to about 300 V. During this time, Q1 is ON and the voltage at collector of Q1 is HIGH. Through R4, the capacitor C8 is charged. Within the first half cycle of the AC Mains input voltage after U2 is turned ON by the high voltage detection, when the input voltage at the cathode of D9 and D10 drops below the hysteresis voltage $V_{TH2}$ (e.g., 300V), then U2, Q1, and Q2 become OFF, and C8 begins to discharge through R4, R3 and R2. However, beneficially the values of C8, R4, R3 and R2 are chosen so that the discharge time constant is very long (e.g., 1 second). Meanwhile the SCR turns OFF naturally when the input voltage is close to a zero crossing. When the second half cycle occurs after high voltage detector 943 has first detected that the voltage $V_{IN}$ at the input to rectifier 930 exceeds the first voltage threshold $V_{TH1}$, then U2, Q1 and Q2 are triggered and turned ON again, the SCR is triggered ON again, C8 is charged through R4 again, and during the second half cycle, C8 is charged to a voltage which is greater than the Zener voltage of Zener diode D6. As a result, Q3 is turned ON through D8 and R8, and when Q3 turns ON, latches Q1 ON. With Q3 turned ON and Q1 latched ON, the gate of the SCR is pulled down, thereby latching if OFF permanently until the AC Mains voltage input to lighting driver 900 is powered off, for example via a wall switch or circuit breaker so that the neutral line may be reconnected to lighting driver 900. With the SCR latched OFF, MOV2 won't conduct anymore after the second half cycle and it will remain disabled until AC Mains is powered off. Other circuits of LED driver 900 survive with 480 VAC input from the loss of the neutral connection.

Next operations of LED lighting driver 900 will be explained for a case where a temporary voltage spike occurs at input terminals L and N, for example due to a lighting surge.

When a lightning surge spike is coupled onto the normal AC Mains input voltage, U2 will triggered, and as result Q1 and Q2 will be turned ON, as described above. Also as described above, this triggers the SCR to turn ON, thereby activating MOV2 to becomes conductive and clamp the rectified voltage at the output of rectifier 830 at a clamping voltage of MOV2 (e.g., 540 V). As a result, components lighting driver 900 which are supplied off of the rectified voltage are protected from the lightning surge.

After the first half cycle of the AC Mains input voltage, the temporary voltage spike subsides and the input voltage level becomes normal again. Meanwhile, the SCR turns OFF naturally when the input voltage is close to a zero crossing. After a time delay elapses, C7 is discharged through R2, and C8 is discharged through R4, R3 and R2. As a result, lighting driver 900 is restored back to is initial state, with MOV2 in a "standby" state ready for the next lighting surge, for example.

Figure 10:
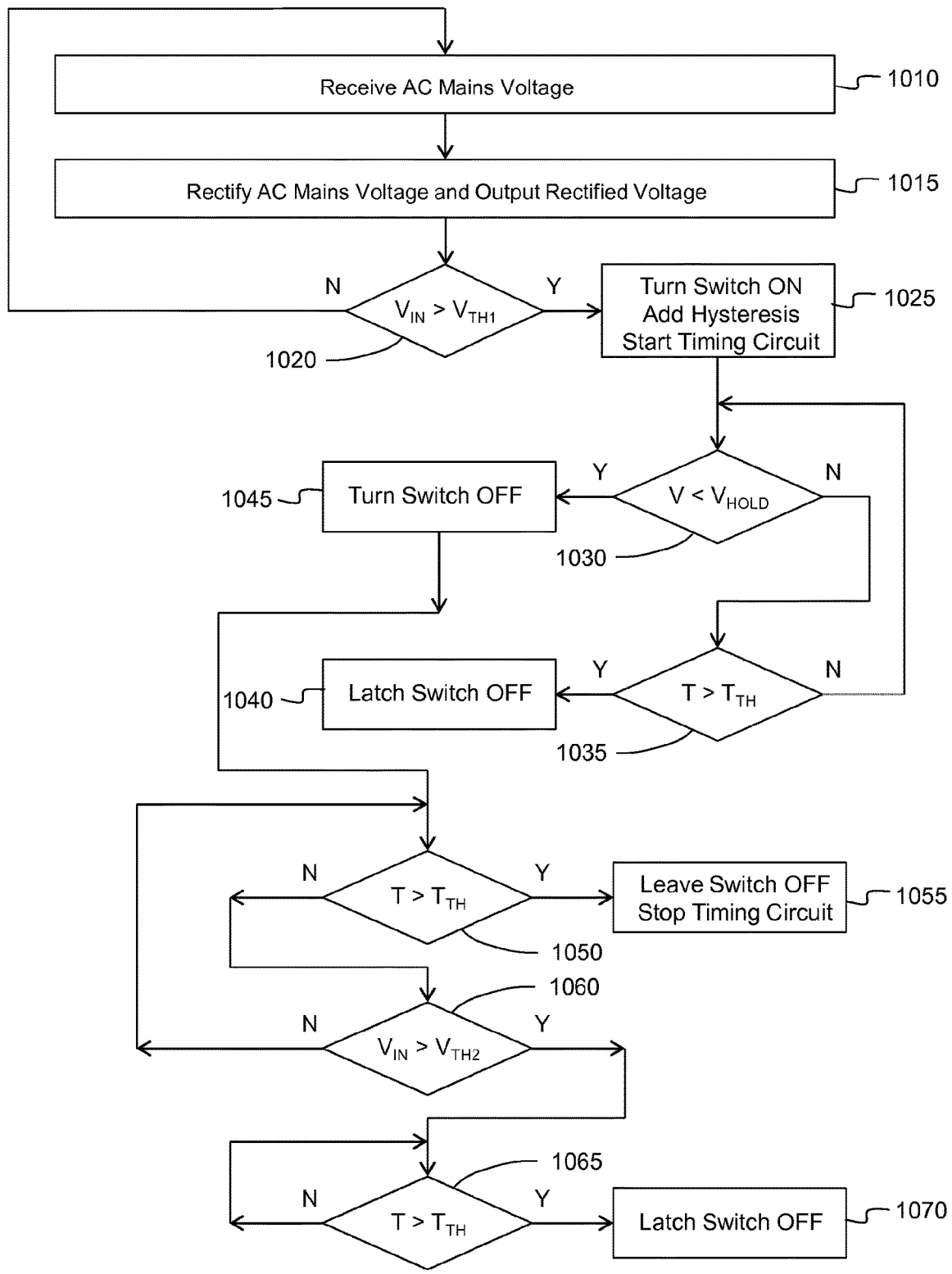
FIG. 10 shows a flowchart of an example embodiment of a method of operating a lighting driver, including detecting and responding to a loss of neutral connection.

FIG. 10 shows a flowchart of an example embodiment of a method 1000 of operating a lighting driver (e.g., LED lighting driver 600, 800 or 900), including detecting and responding to a loss of neutral connection.

In an operation 1010, AC Mains connection terminals of the lighting driver receive an AC Mains voltage.

In an operation 1015, the lighting driver rectifies the received AC Mains Voltage and outputs a rectified voltage.

Here it should be noted that it should be understood by one skilled in the art that one or more operations illustrated in FIG. 10 are continuous operations which may, and do, actually occur in parallel with each other. For example the AC Mains connection terminals may continuously receive the AC Mains voltage while the rectifier continuously rectifies the received AC Mains voltage and outputs rectified voltage, etc.

In an operation 1020, the voltage $V_{IN}$ at the input to rectifier is detected and compared to a first threshold voltage, $V_{TH1}$. Beneficially, the first threshold voltage, $V_{TH1}$ is set to a level which insures that the rectified voltage is less than the voltage ratings of devices (e.g., MOSFETS and diode) in circuits at the output of the rectifier, in order to protect those devices.

If, in operation 1020, $V_{IN} \leq V_{TH1}$, then the lighting driver continues to receive the AC Mains Voltage and continues to rectify the received AC Mains Voltage and output a rectified voltage in operations 1010 and 1020.

However if, in operation 1020, $V_{IN} > V_{TH2}$, then method 1000 proceeds to an operation 1025.

In operation 1025, hysteresis is applied to the voltage $V_{IN}$ at the input to the rectifier, as described above, and a timing circuit is started. Here, it may be understood that the timing circuit may include a timing capacitor (e.g., C8 in lighting driver 900) which begins charging up to a threshold voltage (e.g., the Zener voltage of Zener diode D6 in LED lighting driver 900) according to a set time constant. In that case, the time which it takes for the capacitor to charge up to the threshold voltage corresponds to a time delay or time threshold $T_{TH}$ which is measured by the timing circuit.

In operation 1030, the voltage $V_{IN}$ at the input to the rectifier is detected and compared to a hold voltage, $V_{HOLD}$ for a switching device (e.g., SCR) which is connected in series with the voltage clamping device.

If, in operation 1030, it is determined that the detected voltage $V_{IN}$ is greater than or equal to the hold voltage, $V_{HOLD}$, then method 1000 proceeds to an operation 1035 where the time T since the voltage $V_{IN}$ at the input to the rectifier was first determined to be greater than the first threshold voltage, $V_{TH1}$ is compared to the time threshold $T_{TH}$.

If, in operation 1035, the time T is determined to be less than or equal to the time threshold $T_{TH}$, then method 1000 returns to operation 1030 as described above.

However if, in operation 1035, the time T is determined to be greater than the time threshold $T_{TH}$, then method 1000 proceeds to operation 1040 where the series switch (e.g., the SCR in FIG. 9) is latched OFF and the voltage clamping device (e.g., MOV2) is disabled until the AC Mains voltage input to the lighting driver is powered off, for example via a wall switch or circuit breaker so that the neutral line may be reconnected to the lighting driver. Normally operation 1035 should not occur, since there should be at least one zero crossing of the voltage $V_{IN}$ at the input to the rectifier, which would be less than $V_{HOLD}$, before the time threshold elapses. So this can be seen a failsafe operation to disable the voltage clamping device and prevent its damage in the case of some unforeseen condition occurring.

If, in operation 1030, it is determined that the detected voltage $V_{IN}$ is less than the hold voltage, $V_{HOLD}$, then method 1000 proceeds to an operation 1045, where the series switch (e.g., the SCR in FIG. 9) is turned OFF and the voltage clamping device (e.g., MOV2) is deactivated. Then method 1000 proceeds to operation 1050.

In operation 1050, the time T since the voltage $V_{IN}$ at the input to the rectifier was first determined to be greater than the first threshold voltage, $V_{TH1}$, is compared to the time threshold $T_{TH}$.

If, in operation 1050, the time T is greater than the time threshold $T_{TH1}$, this indicates that the overvoltage detection was for a temporary voltage spike (e.g., a lightning surge). In that case, method 1000 proceeds to operation 1055 where the series switch is left OFF and the timing circuit ends (e.g., the voltage on the timing capacitor discharges).

However if, in operation 1050, the time T is less than or equal to the time threshold $T_{TH}$, then method 1000 proceeds to operation 1060 where the voltage $V_{IN}$ at the input to the rectifier is again compared to a second threshold voltage, $V_{TH2}$. Here, the second threshold voltage, $V_{TH2}$ may be the same as or less than the first threshold voltage, $V_{TH1}$, for example due to the hysteresis described above.

If, in operation, 1060 $V_{IN} \leq V_{TH2}$, then method 1000 returns to operation 1050.

However if, in operation, 1060 $V_{IN} > V_{TH2}$, this indicates that the overvoltage detection was for a loss of neutral connection to the lighting driver. In that case, method 1000 proceeds to operation 1065 where the time T since the voltage $V_{IN}$ at the input to the rectifier was first determined to be greater than the first threshold voltage, $V_{TH1}$ is compared to the time threshold $T_{TH}$.

If, in operation 1065, the time T is determined to be less than or equal to the time threshold $T_{TH}$, then method 1000 returns to operation 1065 and continues to check to see if the time threshold $T_{TH}$ has expired.

However if, in operation 1065, then method 1000 proceeds to operation 1070, where the series switch (e.g., the SCR in FIG. 9) is latched OFF and the voltage clamping device (e.g., MOV2) is disabled until the AC Mains voltage input to the lighting driver is turned off.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting driver, comprising:
a rectifier having an input configured to receive an AC Mains voltage and further having an output configured to output a rectified voltage;
an output stage configured to supply an output current in response to the rectified voltage;
a surge protection circuit comprising:
a voltage clamping device connected across the output of the rectifier, and
a differentiator circuit configured to differentiate between a temporary voltage spike at the input to the rectifier and a loss of a neutral connection to the lighting driver, and when the temporary voltage spike is detected to activate the voltage clamping device to clamp the rectified voltage until the temporary voltage spike ends, and when the loss of the neutral connection is detected to latch the voltage clamping device into a disabled state until the AC Mains voltage input to the lighting driver is turned off.

2. The lighting driver of claim 1, wherein the differentiator circuit is configured to detect when a voltage at the input to the rectifier exceeds a first voltage threshold, and when the voltage at the input to the rectifier exceeds the first voltage threshold to differentiate between the temporary voltage spike at the input to the rectifier and the loss of the neutral connection to the lighting driver based on a length of time that the voltage at the input to the rectifier continues to exceed the first voltage threshold.

3. The lighting driver of claim 1, wherein the differentiator circuit is configured to detect when a voltage at the input to the rectifier exceeds a first voltage threshold and, in response to the voltage at the input to the rectifier exceeding the first voltage threshold, to differentiate between the temporary voltage spike at the input to the rectifier and the loss of the neutral connection to the lighting driver by determining whether the voltage at the input to the rectifier continues to exceed the first voltage threshold after a time delay has elapsed from a time when the differentiator circuit detected that the voltage at the input to the rectifier exceeded the first voltage threshold.

4. The lighting driver of claim 1, wherein the differentiator circuit comprises:
a high voltage detector configured to detect when a voltage at the input to the rectifier exceeds a first voltage threshold,
a switch control arrangement,
a latch, and
a timing circuit,
wherein the differentiator circuit is configured such that, in response to the high voltage detector detecting that the voltage at the input to the rectifier exceeds the first voltage threshold: (1) the switch control arrangement activates the voltage clamping device, and (2) the timing circuit determines whether the high voltage detector continues to detect that the voltage at the input to the rectifier exceeds the first voltage threshold after a predetermined time delay has elapsed, and when the high voltage detector continues to detect that the voltage at the input to the rectifier exceeds the first voltage threshold after the predetermined time delay has elapsed then the latch latches the voltage clamping device in the disabled state until the AC Mains voltage input to the lighting driver is turned off, and when the high voltage detector detects that voltage at the input to the rectifier does not exceed the first voltage threshold after the predetermined time delay has elapsed, then the switch control arrangement deactivates the voltage clamping device to be in a standby state to be activated again in case the high voltage detector again detects that the voltage at the input to the rectifier exceeds the first voltage threshold again.

5. The lighting driver of claim 4, further comprising a switch (SW) connected in series with the voltage clamping device across the output of the rectifier, wherein the switch control arrangement is configured to activate the voltage clamping device by closing the switch (SW) when the high voltage detector detects that the voltage at the input to the rectifier exceeds the first voltage threshold.

6. The lighting driver of claim 5, wherein the latch latches the voltage clamping device into the disabled state until the AC Mains voltage input to the lighting driver is turned off by latching the switch (SW) to remain open until the AC Mains voltage input to the lighting driver is turned off.

7. The lighting driver of claim 4, wherein the differentiator circuit includes a hysteresis circuit such that after the high voltage detector detects that the voltage at the input to the rectifier exceeds the first voltage threshold, and the voltage clamping device is activated, so long as the voltage at the input to the rectifier remains greater than a hysteresis voltage which is less than the first voltage threshold, the switch control arrangement will continue activating the voltage clamping device.

8. The lighting driver of claim 1, further comprising a DALI transceiver, wherein the lighting driver is configured such that when the differentiator circuit detects a loss of neutral connection to the lighting driver, the lighting driver communicates a DALI message via the DALI transceiver to a DALI controller which is external to the lighting driver.

9. A method, comprising:
receiving an AC Mains voltage at an input of a rectifier of a lighting driver;
outputting a rectified voltage at the output of the rectifier;
supplying an output current to a lighting device in response to the rectified voltage;
providing a voltage clamping device across the output of the rectifier;
detecting when a voltage at the input to the rectifier is greater than a first threshold voltage;
when the voltage at the input to the rectifier is greater than the first threshold voltage, differentiating between a temporary voltage spike at the input to the rectifier and a loss of neutral connection to the lighting driver;
when the temporary voltage spike is detected, activating the voltage clamping device to clamp the rectified voltage until the temporary voltage spike ends; and
when the loss of the neutral connection is detected, latching the voltage clamping device into a disabled state until the AC Mains input to the lighting driver is turned off.

10. The method of claim 9, further including differentiating between a temporary voltage spike at the input to the rectifier and a loss of neutral connection to the lighting driver based on a length of time that the voltage at the input to the rectifier continues to exceed the first voltage threshold.

11. The method of claim 9, further including differentiating between a temporary voltage spike at the input to the rectifier and a loss of neutral connection to the lighting driver by determining whether the voltage at the input to the rectifier continues to exceed the first voltage threshold after a time delay has elapsed from a time when it was detected that the voltage at the input to the rectifier exceeded the first voltage threshold.

12. The method of claim 9, further comprising:

in response to a high voltage detector of the lighting driver detecting that the voltage at the input to the rectifier exceeds the first voltage threshold:
- a switch control arrangement activating the voltage clamping device;
- a timing circuit determining whether the high voltage detector continues to detect that the voltage at the input to the rectifier exceeds the first voltage threshold after a predetermined time delay has elapsed;

when the high voltage detector continues to detect that the voltage at the input to the rectifier exceeds the first voltage threshold after the predetermined time delay has elapsed, then latching the voltage clamping device in the disabled state until the AC Mains voltage input to the lighting driver is turned off; and when the high voltage detector detects that the voltage at the input to the rectifier does not exceed the first voltage threshold after the predetermined time delay has elapsed, then deactivating the voltage clamping device to be in a standby state to be activated again in case the voltage at the input to the rectifier exceeds the first voltage threshold again.

13. The method of claim 12, wherein a switch (SW) is connected in series with the voltage clamping device across the output of the rectifier, the method further comprising activating the voltage clamp device by closing the switch (SW) when the voltage at the input to the rectifier exceeds the first voltage threshold.

14. The method of claim 13, wherein latching the voltage clamping device into the disabled state until the AC Mains voltage input to the lighting driver is turned off comprises latching the switch (SW) to remain open until the AC Mains voltage input to the lighting driver is turned off.

15. The method of claim 12, wherein the method includes, after detecting that the voltage at the input to the rectifier is greater than a first threshold voltage continuing to activate the voltage clamping device so long as the voltage at the input to the rectifier remains greater than a hysteresis voltage which is less than the first voltage threshold.

16. The method of claim 9, further comprising, in response to detecting a loss of neutral connection to the lighting driver, communicating a DALI message from the lighting driver to a DALI controller which is external to the lighting driver.

\* \* \* \* \*